(12) United States Patent
Chinnakkonda Vidyapoornachary et al.

(10) Patent No.: US 9,965,017 B2
(45) Date of Patent: May 8, 2018

(54) SYSTEM AND METHOD FOR CONSERVING ENERGY IN NON-VOLATILE DUAL INLINE MEMORY MODULES

(71) Applicant: INTERNATIONAL BUSINESS MACHINES CORPORATION, Armonk, NY (US)

(72) Inventors: Diyanesh B. Chinnakkonda Vidyapoornachary, Bangalore (IN); Kyu-hyoun Kim, Chappaqua, NY (US); Saravanan Sethuraman, Bangalore (IN); Gary A. Tressler, Sandy Hook, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 94 days.

(21) Appl. No.: 15/096,599

(22) Filed: Apr. 12, 2016

(65) Prior Publication Data
US 2017/0293343 A1 Oct. 12, 2017

(51) Int. Cl.
*G06F 1/32* (2006.01)
*G06F 1/26* (2006.01)
*G06F 3/06* (2006.01)

(52) U.S. Cl.
CPC ............ *G06F 1/3225* (2013.01); *G06F 1/266* (2013.01); *G06F 1/3253* (2013.01); *G06F 1/3275* (2013.01); *G06F 3/065* (2013.01); *G06F 3/0625* (2013.01); *G06F 3/0655* (2013.01); *G06F 3/0688* (2013.01); *G06F 1/3203* (2013.01)

(58) Field of Classification Search
CPC .............................. G06F 1/3225; G06F 1/3253
USPC .......................................................... 713/324
See application file for complete search history.

(56) References Cited

U.S. PATENT DOCUMENTS

| | | | |
|---|---|---|---|
| 5,379,398 A * | 1/1995 | Cohn | ................ G06F 11/1466 711/154 |
| 6,564,285 B1 | 5/2003 | Mills et al. | |
| 6,694,451 B2 | 2/2004 | Atkinson | |
| 8,190,788 B2 | 5/2012 | Mochizuki | |
| 8,341,300 B1 | 12/2012 | Karamcheti et al. | |
| 8,432,716 B2 | 4/2013 | Miura et al. | |

(Continued)

FOREIGN PATENT DOCUMENTS

| | | |
|---|---|---|
| JP | 10254590 A | 9/1998 |
| WO | WO 2016164033 A1 * | 10/2016 ............ G06F 12/00 |

*Primary Examiner* — Jaweed A Abbaszadeh
*Assistant Examiner* — Volvick Derose
(74) *Attorney, Agent, or Firm* — Cantor Colburn LLP

(57) ABSTRACT

A computer-implemented method for controlling power consumption in a non-volatile dual inline memory module (NVDIMM-N) may include determining, via a processor, whether the NVDIMM-N is receiving power from a main power source, inactivating, via the processor, a data bus connected to an NVDIMM-N memory group responsive to determining that the NVDIMM-N is not receiving power from the main power source, backing up data stored in the NVDIMM-N memory group, via the processor, to a non-volatile memory module integrated with the NVDIMM-N, where an NVDIMM-N controller can access the NVDIMM-N memory group while backing up, and transmitting, via the processor, a low power command to an NVDIMM-N controller to place the NVDIMM-N memory group in a low power mode.

20 Claims, 6 Drawing Sheets

(56) References Cited

U.S. PATENT DOCUMENTS

| | | | |
|---|---|---|---|
| 9,047,178 B2 | 6/2015 | Talagala et al. | |
| 9,190,124 B2 | 11/2015 | Fanning et al. | |
| 2008/0172523 A1* | 7/2008 | Tanaka | G06F 1/3225 711/103 |
| 2010/0017637 A1* | 1/2010 | Rosay | G06F 1/3203 713/323 |
| 2010/0205348 A1* | 8/2010 | Moshayedi | G11C 5/14 711/102 |
| 2012/0047314 A1* | 2/2012 | Chen | G06F 11/1456 711/103 |
| 2014/0101370 A1 | 4/2014 | Chu et al. | |
| 2015/0153817 A1* | 6/2015 | McKenney | G06F 9/5094 713/323 |
| 2015/0248935 A1 | 9/2015 | Moshayedi et al. | |
| 2015/0255130 A1 | 9/2015 | Lee et al. | |
| 2015/0261672 A1* | 9/2015 | Nguyen | G11C 14/0018 711/118 |
| 2016/0118121 A1* | 4/2016 | Kelly | G06F 13/4068 710/301 |
| 2016/0179640 A1* | 6/2016 | Murata | G06F 11/1441 714/14 |
| 2016/0306756 A1* | 10/2016 | Yoon | G06F 13/161 |
| 2017/0060697 A1* | 3/2017 | Berke | G06F 11/1456 |
| 2017/0147490 A1* | 5/2017 | Arafa | G06F 12/0804 |

\* cited by examiner

SYSTEM AND METHOD FOR CONSERVING ENERGY IN NON-VOLATILE DUAL INLINE MEMORY MODULES

BACKGROUND

The present disclosure relates to non-volatile dual inline memory modules (NVDIMM-Ns), and more specifically, to conserving energy in NVDIMM-Ns.

NVDIMM-Ns are a type of non-volatile dual inline memory module that is byte-addressable and memory-mapped. NVDIMM-Ns are typically accessed by the memory controller at memory or near-memory speeds. NVDIMM-N-Ns may incorporate DRAM, flash memory, control logic and an independent power source to retain in-memory data through unexpected power loss events, such as system crashes or planned shutdowns. During normal operation, the NVDIMM-N appears to the host system as a DRAM memory module, providing the speed, latency and endurance benefits of DRAM. In the event of an unexpected power loss or system crash, the data residing in the DRAM is saved to flash memory. When power is returned, the in-memory state of the DRAM is restored from flash memory. For most NVDIMM-N solutions, the backup power to transfer the DRAM contents to flash is provided by supercapacitors or other backup power sources. For example, an NVDIMM-N plugs into a Joint Electron Device Engineering Council (JEDEC)-compliant dual inline memory module (DIMM) socket and operates as a DRAM DIMM during runtime. An NVDIMM-N will retain its data through a power loss event or system crash.

One main application of NVDIMM-N memory is to keep data persistent, in case of a power failure or catastrophic software and/or hardware failure. Capability to support data persistency often requires DRAM memory to be active, so that data can be copied from DRAM to flash, in case of power failure. Keeping all of the memory active may limit the data persistence because of backup power constraints. When memory (partially or fully) is not in use, conventional DRAM based memory consumes power to support refresh operation for data retention. Accordingly, it may be advantageous to provide systems and methods for conserving NVDIMM-N power for data continuity during a power failure or system crash.

SUMMARY

According to an embodiment of the present invention, a computer-implemented method for controlling power consumption in a non-volatile dual inline memory module (NVDIMM-N) is described. The method may include determining, via a processor, whether the NVDIMM-N is receiving power from a main power source, inactivating, via the processor, a data bus connected to an NVDIMM-N memory group responsive to determining that the NVDIMM-N is not receiving power from the main power source, backing up data stored in the NVDIMM-N memory group, via the processor, to a non-volatile memory module integrated with the NVDIMM-N, where an NVDIMM-N controller can access the NVDIMM-N memory group while backing up, and transmitting, via the processor, a low power command to an NVDIMM-N controller to place the NVDIMM-N memory group in a low power mode.

According to other embodiments, a system for controlling power consumption in a non-volatile dual inline memory module (NVDIMM-N) is described. The system may include a processor configured to determine whether the NVDIMM-N is receiving power from a main power source, inactivate a data bus connected to an NVDIMM-N memory group responsive to determining that the NVDIMM-N is not receiving power from the main power source, backup data stored in the NVDIMM-N memory group, via the processor, to a non-volatile memory module integrated with the NVDIMM-N, wherein an NVDIMM-N controller can access the NVDIMM-N memory group while backing up, and transmit a low power command to an NVDIMM-N controller to place the NVDIMM-N memory group in a low power mode.

According to yet other embodiments, a non-transitory computer-readable storage medium is described. The non-transitory storage medium may include program instructions that are executable by a processor to perform a method for controlling power consumption in a non-volatile dual inline memory module (NVDIMM-N). The method may include determining, via a processor, whether the NVDIMM-N is receiving power from a main power source, inactivating, via the processor, a data bus connected to an NVDIMM-N memory group responsive to determining that the NVDIMM-N is not receiving power from the main power source, backing up data stored in the NVDIMM-N memory group, via the processor, to a non-volatile memory module integrated with the NVDIMM-N, where an NVDIMM-N controller can access the NVDIMM-N memory group while backing up, and transmitting, via the processor, a low power command to an NVDIMM-N controller to place the NVDIMM-N memory group in a low power mode.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
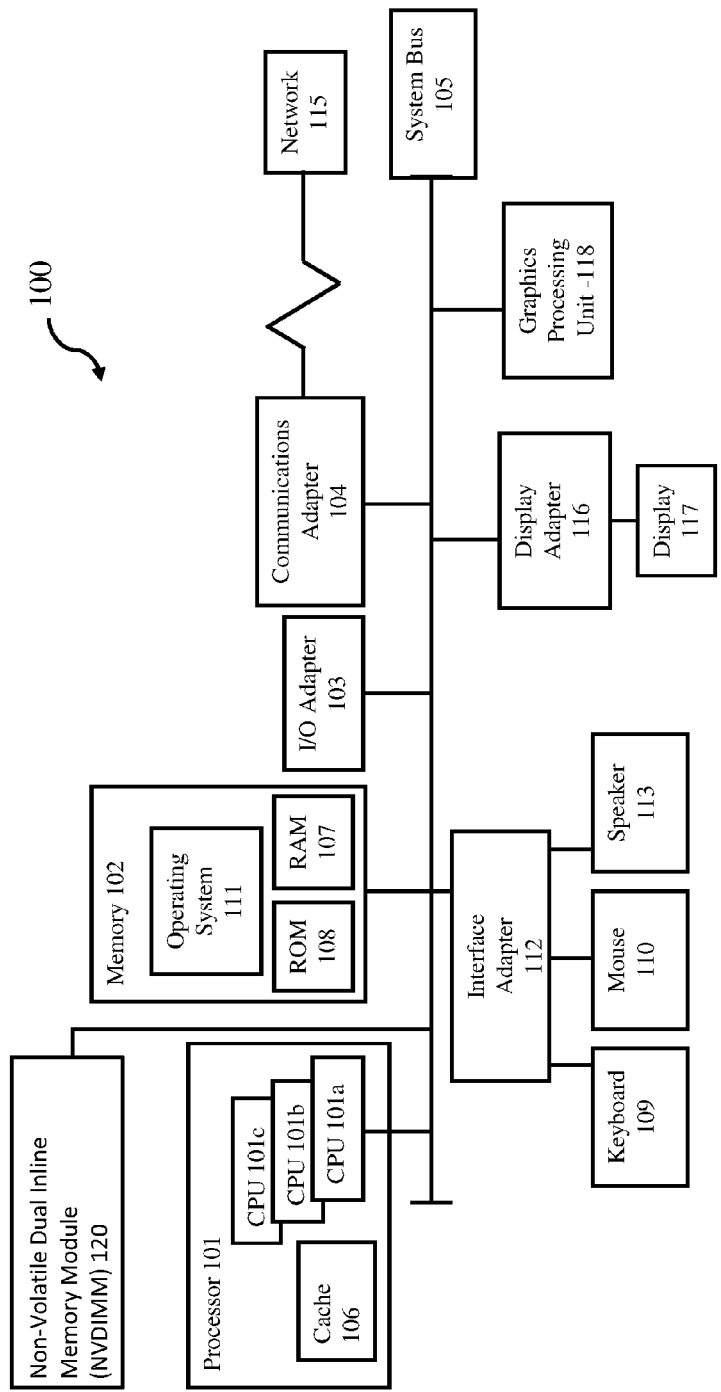
FIG. 1 illustrates a block diagram of a computer system for use in practicing the teachings herein.

FIG. 1 illustrates a block diagram of a computer system 100 (hereafter "computer 100") for use in practicing the embodiments described herein. The methods described herein can be implemented in hardware, software (e.g., firmware), or a combination thereof. In an exemplary embodiment, the methods described herein are implemented in hardware, and may be part of the microprocessor of a special or general-purpose digital computer, such as a personal computer, workstation, minicomputer, or mainframe computer. Computer 100 therefore can embody a general-purpose computer. In another exemplary embodiment, the methods described herein are implemented as part of a mobile device, such as, for example, a mobile phone, a personal data assistant (PDA), a tablet computer, etc.

In an exemplary embodiment, in terms of hardware architecture, as shown in FIG. 1, the computer 100 includes processor 101. Computer 100 also includes memory 102 coupled to processor 101, and one or more input/output adaptors 103, which may be communicatively coupled via system bus 105. Memory 102 may be operatively coupled to one or more internal or external memory devices. Communications adaptor 104 may be operatively connect computer 100 to one or more networks 115. A system bus 105 may also connect one or more user interfaces via interface adaptor 112. Interface adaptor 112 may connect a plurality of user interfaces to computer 100 including, for example, keyboard 109, mouse 110, speaker 113, etc. System bus 105 may also connect display adaptor 116 and display 117 to processor 101. Processor 101 may also be operatively connected to graphical processing unit 118.

Processor 101 is a hardware device for executing hardware instructions or software, particularly that stored in a non-transitory computer-readable memory (e.g., memory 102). Processor 101 can be any custom made or commercially available processor, a central processing unit (CPU), a plurality of CPUs, for example, CPU 101a-101c, an auxiliary processor among several other processors associated with the computer 100, a semiconductor based microprocessor (in the form of a microchip or chip set), or generally any device for executing instructions. Processor 101 can include a memory cache 106, which may include, but is not limited to, an instruction cache to speed up executable instruction fetch, a data cache to speed up data fetch and store, and a translation lookaside buffer (TLB) used to speed up virtual-to-physical address translation for both executable instructions and data. Cache 106 may be organized as a hierarchy of more cache levels (L1, L2, etc.).

Memory 102 can include random access memory (RAM) 107 and read only memory (ROM) 108. RAM 107 can be any one or combination of volatile memory elements (e.g., DRAM, SRAM, SDRAM, etc.) and nonvolatile memory elements (flash memory, etc.). ROM 108 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 102 may incorporate electronic, magnetic, optical, and/or other types of non-transitory computer-readable storage media. Note that the memory 102 can have a distributed architecture, where various components are situated remote from one another, but can be accessed by the processor 101.

The instructions in memory 102 may include one or more separate programs, each of which comprises an ordered listing of computer-executable instructions for implementing logical functions. In the example of FIG. 1, the instructions in memory 102 may include an operating system 111. Operating system 111 can control the execution of other computer programs and provides scheduling, input-output control, file and data management, memory management, and communication control and related services.

Input/output adaptor 103 can be, for example but not limited to, one or more buses or other wired or wireless connections, as is known in the art. Input/output adaptor 103 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

Interface adaptor 112 may be configured to operatively connect one or more input/output (I/O) devices to computer 100. For example, interface adaptor 112 may connect a keyboard 109 and mouse 110. Other output devices, e.g., speaker 113 may be operatively connected to interface adaptor 112. Other output devices may also be included, although not shown. For example, devices may include but are not limited to a printer, a scanner, microphone, and/or the like. Finally, the I/O devices connectable to interface adaptor 112 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

Computer 100 can further include display adaptor 116 coupled to one or more displays 117. In an exemplary embodiment, computer 100 can further include communications adaptor 104 for coupling to a network 115.

Network 115 can be an IP-based network for communication between computer 100 and any external device. Network 115 transmits and receives data between computer 100 and devices and/or systems external to computer 100. In an exemplary embodiment, network 115 can be a managed IP network administered by a service provider. Network 115 may be a network internal to an aircraft, such as, for example, an avionics network, etc. Network 115 may be implemented in a wireless fashion, e.g., using wireless protocols and technologies, such as WiFi, WiMax, etc. Network 115 may also be a wired network, e.g., an Ethernet network, an ARINC 429 network, a CAN, etc., having any wired connectivity including, e.g., an RS232 connection, R5422 connection, etc. Network 115 can also be a packet-switched network such as a local area network, wide area network, metropolitan area network, Internet network, or other similar type of network environment. The network 115 may be a fixed wireless network, a wireless local area network (LAN), a wireless wide area network (WAN) a personal area network (PAN), a virtual private network (VPN), intranet or other suitable network system.

If computer 100 is a mainframe computer, a PC, workstation, laptop, tablet computer and/or the like, the instructions in the memory 102 may further include a basic input output system (BIOS) (omitted for simplicity). The BIOS is a set of essential routines that initialize and test hardware at startup, start operating system 111, and support the transfer of data among the operatively connected hardware devices. The BIOS is stored in ROM 108 so that the BIOS can be executed when computer 100 is activated. When computer 100 is in operation, processor 101 may be configured to execute instructions stored within the memory 102, to communicate data to and from the memory 102, and to generally control operations of the computer 100 pursuant to the instructions.

Enterprise computer systems may include large memory capacity, memory density and greater numbers of memory modules, making overall system power requirements an issue for data persistency in the memory management system. Data persistence systems for dual inline memory modules (DIMMs) work to preserve active data during a power failure event using, among other components, a non-volatile DIMM (NVDIMM-N) controller, battery backup power source and onboard DRAM and NAND flash memory. When a power loss occurs, the NVDIMM-N controller senses the loss and backs up the DIMM modules to flash memory. When power is restored, the NVDIMM-N controller restores backup data from flash back to DIMM memory. A power source operates as the power source during the main power outage to safely restore the data.

It may be beneficial to optimize the backup energy when the data in a particular memory element (e.g., a memory rank, bank, etc.) is not in use. Current systems and methods do not exploit memory usage conditions in order to make non-volatile dual inline memory module implementation energy efficient, and do not manage power usage for idle memory ranks and/or banks to conserve power. For example, current methods may not manipulate architectural features to enable fine grain energy savings at the physical attribute level (e.g., memory rank and bank), and at the logical block level (e.g., the load memory buffer across a plurality of ranks and banks). Moreover, data transfer schemes in current systems do not discriminate between active and inactive ranks and/or banks of memory during the data transfer. Thus the host controller cannot access DRAM (e.g., the entire DIMM module) when data is being transferred. Accordingly, it may be beneficial to provide a system and method for managing NVDIMM-Ns to address these problems.

Figure 2:
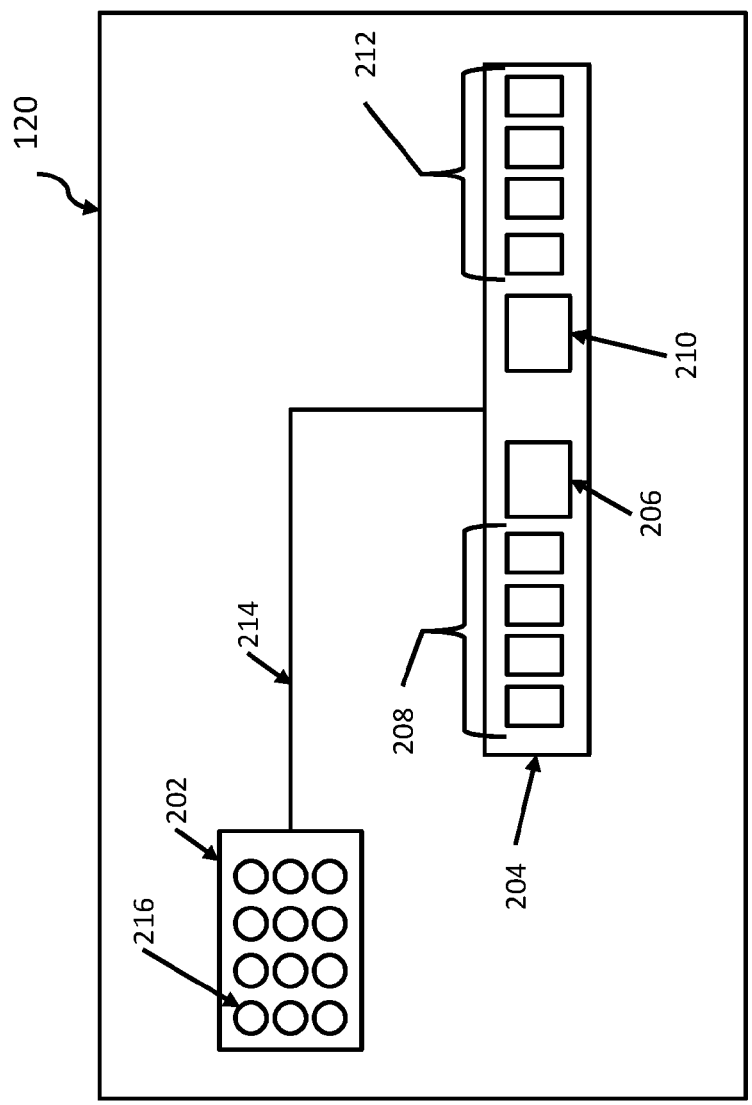
FIG. 2 depicts a non-volatile dual inline memory module (NVDIMM-N) according to one embodiment.

FIG. 2 depicts a non-volatile dual inline memory module (NVDIMM-N) 120. NVDIMM-Ns (e.g., NVDIMM-N 120) may incorporate an NVDIMM-N board 204 having one or more dynamic random access memory (DRAM) units 208, one or more NAND memory units 212 such as flash memory or other non-volatile memory modules, an NVDIMM-N controller 206 having control logic for controlling the one or more dynamic random access memory (DRAM) units 208, a non-volatile memory controller 210 configured to control the one or more NAND memory units 212, and an independent power source 202 configured to provide power via a power bus 214 to retain in-memory data through an unexpected power loss event, a system crash or a planned shutdown of computer 100. Independent power source 202 may be, for example, a super-capacitor having a plurality of capacitors 216. NVDIMM-N may be configured as a byte addressable DIMM sitting in DDR interface with flash backup.

Figure 3:
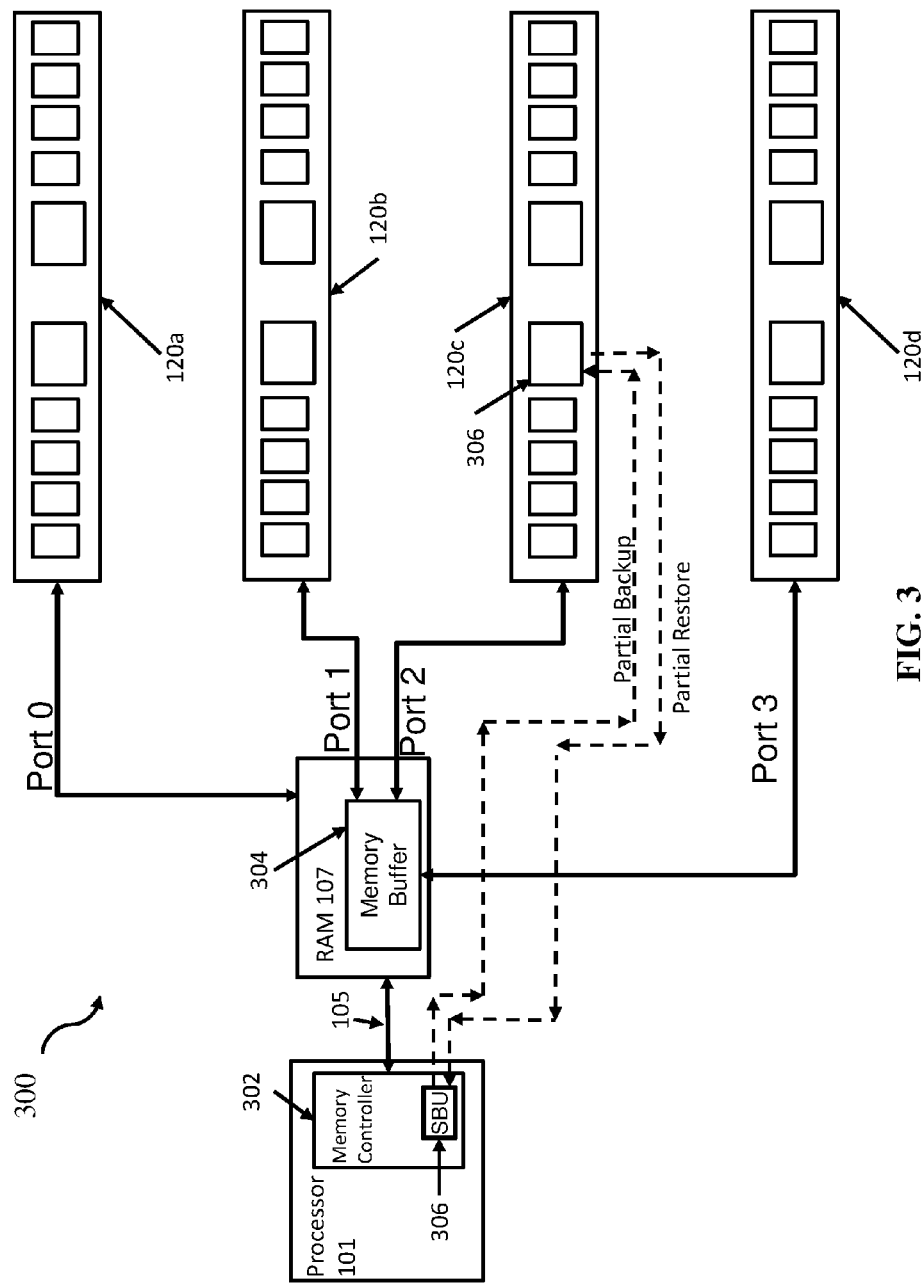
FIG. 3 depicts a system for controlling power consumption in an NVDIMM-N according to one embodiment.

FIG. 3 depicts a system 300 for controlling power consumption in a NVDIMM-N, according to some embodiments. System 300 may include processor 101, ram 107 and at least one NVDIMM-N module (depicted, for example, as NVDIMM-Ns 120a, 120b, 120c, and 120d). RAM 107 may include a memory buffer 304. Although FIG. 3 depicts four NVDIMM-Ns, it is contemplated that any number of NVDIMM-Ns may be incorporated into system 300.

Processor 101 may be connected to memory buffer 304 via system bus 105. NVDIMM-N 120a, 120b, 120c, 120d, etc., may connect to RAM 107 via a corresponding port (e.g., ports 0, 1, 2, and 3, etc.). Although four ports are shown in FIG. 3, it is contemplated that system 300 may include any number of ports in a scalable memory system. Processor 101 may include one or more memory controllers 302.

Memory controller 302 may be configured to control NVDIMM-N 120a-120d. Memory controller 302 may include a smart backup unit (SBU) 306. SBU 306 may alternatively be located in memory controller 302, or memory buffer 304. Although four ports are shown, system 300 may have any number (1 or more) ports.

Figure 4:
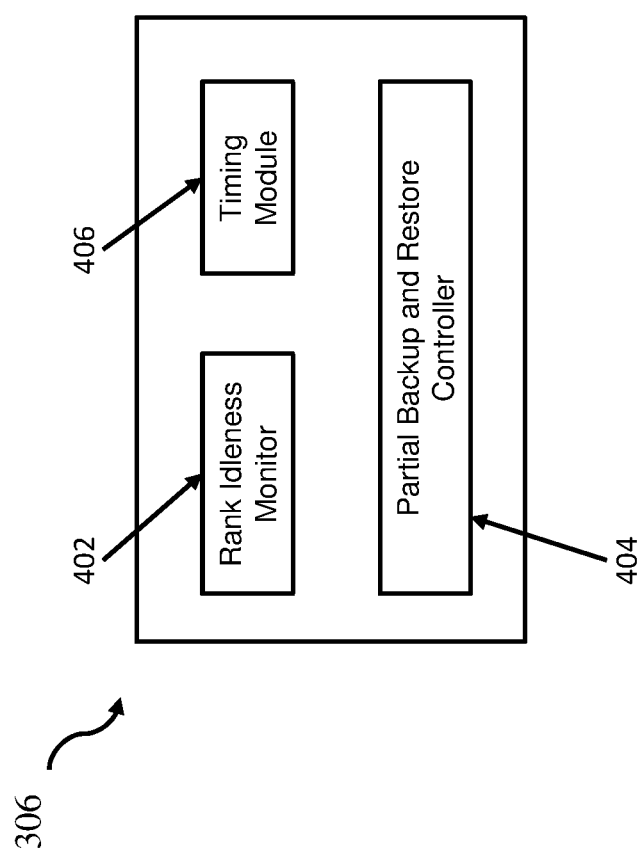
FIG. 4 depicts a smart backup unit (SBU) according to one embodiment.

FIG. 4 depicts an exemplary SBU 306, according to some embodiments. Referring now to FIG. 4, SBU 306 may include a rank idleness monitor 402, a partial backup and restore controller 404, and a timing module 406. SBU 306 may be configured to track the backup locations using timing modules. SBU 306 may also be configured to control an address bit (sticky bit) indicative of memory activity for a particular memory location. For example, SBU 306 may be configured to update an energy mode status table stored in RAM 107 having a status indicated by the sticky bit associated with each memory location of NVDIMM-N 120 in use. Although not shown, the sticky bit may be any predetermined bit of a memory address configured to hold a binary value representative of the activity of a particular memory address, bank, and/or rank (1 for active and 0 for inactive, e.g.,). According to some embodiments, SBU 306 can be part of a DIMM controller (e.g., NVDIMM-N controller 206), a memory buffer (e.g., memory buffer 304), or a memory controller (e.g., memory controller 302).

Rank idleness monitor 402 may be configured to monitor memory activity on DRAM units 208. For example, rank idleness monitor 402 may monitor DRAM units 208 to determine whether processor 101 and/or memory buffer 304 reading and or writing data to DRAM units 208). Accordingly, rank idleness monitor 402 may determine whether the memory group is idle, command the memory group to go into a low power mode responsive to determining that a particular rank is idle, and update an energy mode status table with information indicative of the memory group responsive to determining that the memory group is idle.

Partial backup and restore controller 404 may be configured to back up data from DRAM units 208 to NAND memory units 212. For example, according to some embodiments, processor 101 may determine whether the memory group is idle, command the memory group to go into a low power mode, and update an energy mode status table with information indicative of the memory group responsive to determining that the memory group is idle.

According to some embodiments, a partial backup of DRAM units 208 may be advantageous to avoid wasting power by continuously powering unused DRAM units. Accordingly, processor 101 may perform a partial backup operation. When processor 101 receives a partial backup command from NVDIMM-N controller 206, timing module 406 may cause processor 101 to compress the data stored in DRAM units 208 and enable a timing module 406 to count and actively store which memory address locations are backed-up by updating the energy mode status table. During this activity, the logic unit sets the sticky bit to indicate that NVDIMM-N 120 is in energy savings mode, which in-turn keeps bus 105 in inactive or in "Quiesce" mode. After processor 101 has completed the backup operation, NVDIMM-N controller 206 may release the sticky bit and continue the computing operations.

Figure 5:
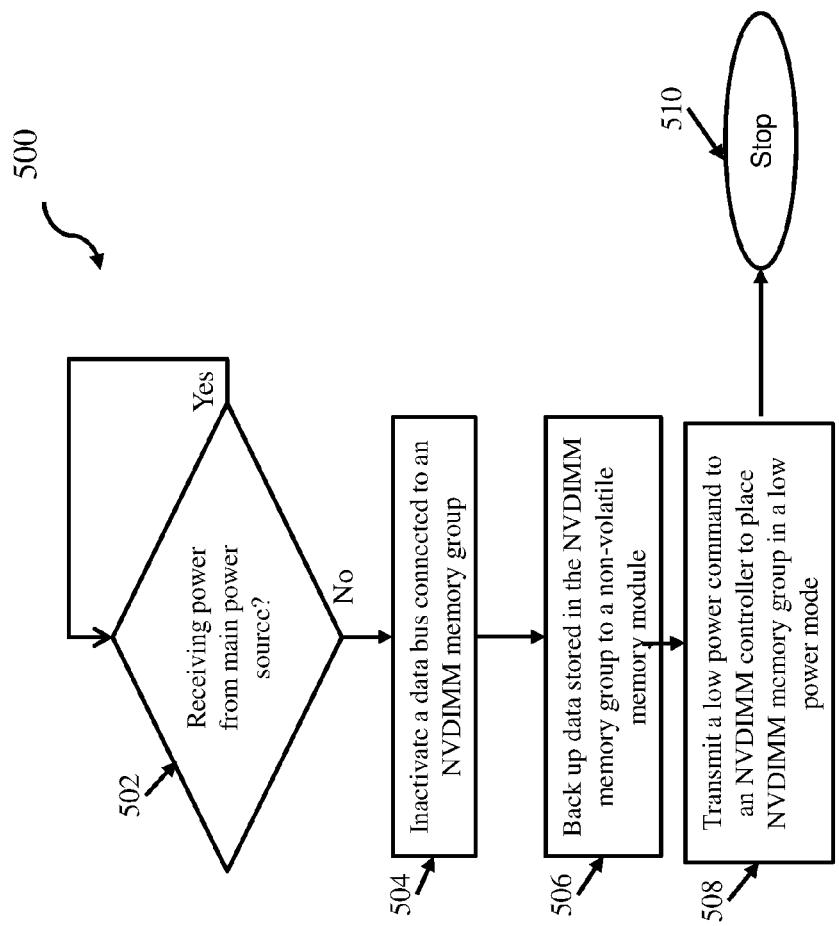
FIG. 5 depicts a flow diagram of a computer-implemented method for controlling power consumption in an NVDIMM-N according to one embodiment.

FIG. 5 depicts a flow diagram of a computer-implemented method for controlling power consumption in an NVDIMM-N (e.g., NVDIMM-N 120), according to one embodiment. The control of power consumption by non-volatile dual inline memory modules, as previously discussed, is increasingly important in large computing systems such as mainframe computers, due to the large quantity of memory modules, the memory density, and availability of backup power to the modules that may prevent data loss during a catastrophic system failure or power outage. One strategy, according to some embodiments described herein, can include performance of partial backup and restore operations by determining, via processor 101, which of the memory elements (DRAM units 208) is actively accessed by or providing data to processor 101 or any other processing elements in computer system 100. A particular selection of active memory units is referred to hereafter as a "memory group." In some aspects, a memory group may be any one or more of a memory bank, a memory rank, and/or a plurality of ranks and banks.

Accordingly, during a partial restore and backup operation, processor 101 may enable fine grain energy savings at the physical attribute level (e.g., at the memory rank and/or bank levels), and at the logical block level (e.g., the load memory buffer across a plurality of ranks and banks) by defining, based on the energy mode status table, which memory groups are currently active. As shown in FIG. 3, SBU 306 may perform partial backup and restore operations to any element (such as, for example NVDIMM-N elements in NVDIMM-N 120c) via NVDIMM-N controller 206. By discriminating between active and inactive memory groups, processor 101 may access any DRAM element (e.g., any of NVDIMM-Ns 120a-120d) when data is being transferred to or from processor 101 during the backup and/or restore processes. In some aspects a memory group may be a single DRAM rank, a DRAM bank, a plurality of DRAM ranks and/or banks, or any combination thereof. For example DRAM units 208, as shown in FIG. 2, may be one of a plurality of memory elements making a memory group.

Referring now to FIG. 5, according to some embodiments, processor 101 may be configured to continually determine whether there has been an interruption of power, as depicted in decision block 502. As shown in block 504, processor 101 may inactivate data bus 105 (or a portion of a data bus connected to NVDIMM-N memory group) responsive to determining that the NVDIMM-N is not receiving power from the main power source. In some aspects, processor 101 may back up data stored in the NVDIMM-N memory group (as shown in block 506) to a non-volatile memory module integrated with the NVDIMM-N. According to some embodiments, as shown in block 508, processor 101 may cause NVDIMM-N controller 206 to access the NVDIMM-N memory group while backing up. In some embodiments, processor 101 may cause NVDIMM-N controller 206 to transmit a low power command to place the NVDIMM-N memory group in a low power mode. In some aspects, a low power mode may indicate that data is not written to or read from a particular memory group.

Figure 6:
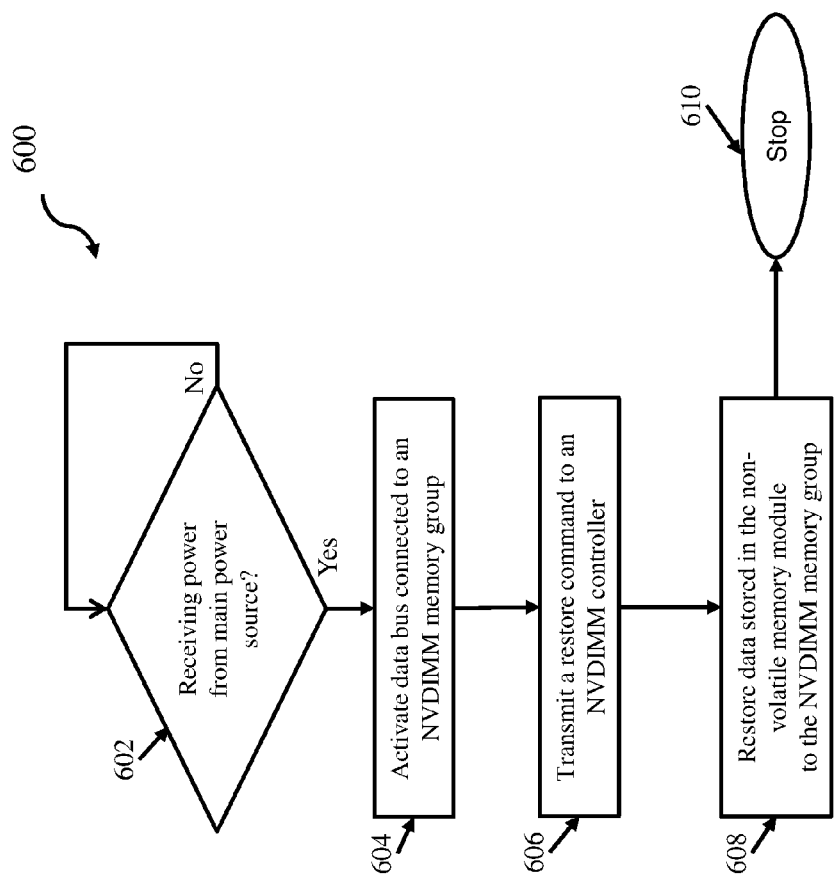
FIG. 6 depicts a flow diagram of a computer-implemented method for controlling power consumption in an NVDIMM-N according to one embodiment.

Referring now to FIG. 6, another flow diagram of a computer-implemented method for controlling power consumption in an NVDIMM-N, according to one embodiment. More particularly, FIG. 6 depicts a flow diagram of a restore operation. As shown in decision block 602, processor 101 may determine whether the NVDIMM-N is receiving power from the main power source. As shown in block 604, processor 101 may activate data bus 105, which may be directly or indirectly connected to the NVDIMM-N memory group. As shown in block 606, processor 101 may transmit a restore command to each of the NVDIMM-N controllers (e.g., NVDIMM-N controller 206) responsive to determining that the NVDIMM-N is receiving power from the main power source. As shown in block 608, processor 101 may restore the data stored on the non-volatile memory to the NVDIMM-N memory group, which may exist across one or more of the NVDIMM-N controllers (e.g., NVDIMM-N controller 206) based on a command from the NVDIMM-N controller. For example, processor 101 may transmit a partial restore command that memory group comprises a load memory buffer (LMB) configured to access a plurality of at least one of memory ranks and memory banks on the NVDIMM-N.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or conterminously, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for controlling power consumption in a non-volatile dual inline memory module (NVDIMM-N) comprising:
    determining, via a processor, whether the NVDIMM-N is receiving power from a main power source;
    inactivating, via the processor, a data bus connected to an NVDIMM-N memory group responsive to determining that the NVDIMM-N is not receiving power from the main power source;
    backing up data stored in the NVDIMM-N memory group, via the processor, to a non-volatile memory module integrated with the NVDIMM-N, wherein an NVDIMM-N controller can access the NVDIMM-N memory group while backing up; and
    transmitting, via the processor, a low power command and a restore command to an NVDIMM-N controller to place the NVDIMM-N memory group in a low power mode; wherein the restore command is indicative that NVDIMM-N memory group comprises a load memory buffer (LMB) configured to access a plurality of memory ranks and memory banks on the NVDIMM-N.

2. The computer-implemented method of claim 1 further comprising:
    determining, via the processor, whether the NVDIMM-N is receiving power from the main power source;
    activating the data bus connected to the NVDIMM-N memory group;
    transmitting, via the processor, the restore command to the NVDIMM-N controller responsive to determining that the NVDIMM-N is receiving power from the main power source; and
    restoring data stored on the non-volatile memory module to the NVDIMM-N memory group based on a command from the NVDIMM-N controller.

3. The computer-implemented method of claim 2, wherein the NVDIMM-N controller can access the NVDIMM-N memory group while restoring the data stored on the non-volatile memory module.

4. The computer-implemented method of claim 2, wherein the restore command is a partial restore command indicative that NVDIMM-N memory group comprises the LMB.

5. The computer-implemented method of claim 1, wherein the NVDIMM-N memory group comprises a NVDIMM-N memory rank.

6. The computer-implemented method of claim 1, wherein the NVDIMM-N memory group comprises a NVDIMM-N memory bank and a plurality of bank groups.

7. The computer-implemented method of claim 1, wherein the low power command includes instructions for a partial backup process, the partial backup process comprising:
- determining, via the processor, whether the NVDIMM-N memory group is idle;
- commanding, via the processor, the NVDIMM-N memory group to go into a low power mode; and
- updating, via the processor, an energy mode status table with information indicative of the NVDIMM-N memory group responsive to determining that the NVDIMM-N memory group is idle.

8. The computer-implemented method of claim 7, further comprising:
- determining, via the processor, whether the NVDIMM-N is receiving power from the main power source;
- activating, via the processor, the data bus connected to the NVDIMM-N memory group;
- transmitting, via the processor, a restore command to the NVDIMM-N controller responsive to determining that the NVDIMM-N is receiving power from the main power source; and
- restoring, via the processor, data stored on the non-volatile memory module to the NVDIMM-N memory group based on a command from the NVDIMM-N controller.

9. A system for controlling power consumption in a non-volatile dual inline memory module (NVDIMM-N) comprising a processor configured to:
- determine whether the NVDIMM-N is receiving power from a main power source;
- inactivate a data bus connected to an NVDIMM-N memory group responsive to determining that the NVDIMM-N is not receiving power from the main power source;
- backup data stored in the NVDIMM-N memory group, via the processor, to a non-volatile memory module integrated with the NVDIMM-N, wherein an NVDIMM-N controller can access the NVDIMM-N memory group while backing up; and
- transmit a low power command and a partial restore command to an NVDIMM-N controller to place the NVDIMM-N memory group in a low power mode; wherein the partial restore command is indicative that NVDIMM-N memory group comprises a load memory buffer (LMB) configured to access a plurality of memory ranks and memory banks on the NVDIMM-N.

10. A system of claim 9 further comprising:
- determining, via the processor, whether the NVDIMM-N is receiving power from the main power source;
- activating the data bus connected to the NVDIMM-N memory group;
- transmitting, via the processor, the restore command to the NVDIMM-N controller responsive to determining that the NVDIMM-N is receiving power from the main power source; and
- restoring data stored on the non-volatile memory module to the NVDIMM-N memory group based on a command from the NVDIMM-N controller.

11. A system of claim 10, wherein the NVDIMM-N controller can access the NVDIMM-N memory group while restoring the data stored on the non-volatile memory module.

12. A system of claim 10, wherein the restore command is a partial restore command indicative that the NVDIMM-N memory group comprises the LMB.

13. A system of claim 9, wherein the NVDIMM-N memory group comprises a NVDIMM-N memory rank.

14. A system of claim 9, wherein the NVDIMM-N memory group comprises a NVDIMM-N memory bank and a plurality of bank groups.

15. A system of claim 9, wherein the low power command includes instructions for a partial backup process, the processor is configured to:
- determine whether the NVDIMM-N memory group is idle;
- command the NVDIMM-N memory group to go into a low power mode; and
- update an energy mode status table with information indicative of the NVDIMM-N memory group responsive to determining that the NVDIMM-N memory group is idle.

16. The system of claim 15, wherein the processor is further configured to:
- determine whether the NVDIMM-N is receiving power from the main power source;
- activate the data bus connected to the NVDIMM-N memory group;
- transmit a restore command to the NVDIMM-N controller responsive to determining that the NVDIMM-N is receiving power from the main power source; and
- restore data stored on the non-volatile memory module to the NVDIMM-N memory group based on a command from the NVDIMM-N controller.

17. A non-transitory storage medium may include program instructions that are executable by a processor to perform a method for controlling power consumption in a non-volatile dual inline memory module (NVDIMM-N), the method comprising:
- determining, via a processor, whether the NVDIMM-N is receiving power from a main power source;
- inactivating, via the processor, a data bus connected to an NVDIMM-N memory group responsive to determining that the NVDIMM-N is not receiving power from the main power source;
- backing up data stored in the NVDIMM-N memory group, via the processor, to a non-volatile memory module integrated with the NVDIMM-N, wherein an NVDIMM-N controller can access the NVDIMM-N memory group while backing up; and
- transmitting, via the processor, a low power command and a partial restore command to an NVDIMM-N controller to place the NVDIMM-N memory group in a low power mode; wherein the partial restore command is indicative that NVDIMM-N memory group comprises a load memory buffer (LMB) configured to access a plurality of memory ranks and memory banks on the NVDIMM-N.

18. The non-transitory storage medium of claim 17, further comprising:
- determining, via the processor, whether the NVDIMM-N is receiving power from the main power source;
- activating the data bus connected to the NVDIMM-N memory group;
- transmitting, via the processor, a restore command to the NVDIMM-N controller responsive to determining that the NVDIMM-N is receiving power from the main power source; and
- restoring data stored on the non-volatile memory module to the NVDIMM-N memory group based on a command from the NVDIMM-N controller.

19. The non-transitory storage medium of claim 18, wherein the NVDIMM-N controller can access the NVDIMM-N memory group while restoring the data stored on the non-volatile memory module.

20. The non-transitory storage medium of claim 17, wherein the NVDIMM-N memory group comprises a NVDIMM-N memory rank.

* * * * *